United States Patent
Saif et al.

(10) Patent No.: US 6,266,193 B1
(45) Date of Patent: *Jul. 24, 2001

(54) ANTI-REFLECTIVE COMPOSITE

(75) Inventors: Mohtashim Saif, Chino; Hassan Memarian, Northridge, both of CA (US)

(73) Assignee: CPFilms Inc., Martinsville, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,844

(22) Filed: May 28, 1998

Related U.S. Application Data

(60) Provisional application No. 60/053,825, filed on Jul. 24, 1997, and provisional application No. 60/053,891, filed on Jul. 28, 1997.

(51) Int. Cl.$^7$ ...................................... G02B 1/10
(52) U.S. Cl. .................. 359/582; 359/580; 428/697; 428/699; 428/701
(58) Field of Search ................... 359/580, 581, 359/582; 428/701, 699, 697, 689

(56) References Cited

U.S. PATENT DOCUMENTS

| | | | |
|---|---|---|---|
| 2,478,385 | 8/1949 | Gaiser | 359/580 |
| 2,854,349 | 9/1958 | Dreyfus et al. | 428/333 |
| 3,185,020 | * 5/1965 | Thelen | 359/586 |
| 3,272,986 | 9/1966 | Schmidt | 136/206 |
| 3,432,225 | 3/1969 | Rock | 359/588 |
| 3,565,509 | 2/1971 | Sulzbach | 359/588 |
| 3,682,528 | 8/1972 | Apfel et al. | 359/360 |
| 3,698,946 | 10/1972 | Kaspaul et al. | 428/432 |
| 3,781,077 | 12/1973 | Groth | 359/360 |
| 3,781,090 | 12/1973 | Sumita | 359/588 |

(List continued on next page.)

FOREIGN PATENT DOCUMENTS

| | | | |
|---|---|---|---|
| 0203730A2 | * 12/1986 | (EP) | 359/581 |
| 581584A1 | * 2/1994 | (EP) | 359/582 |
| 07198902 | 1/1995 | (EP) | G02B/1/11 |

(List continued on next page.)

*Primary Examiner*—Cassandra Spyrou
*Assistant Examiner*—John Juba, Jr.
(74) *Attorney, Agent, or Firm*—Bacon & Thomas

(57) ABSTRACT

An anti-reflective composite is provided having very high visible light transmission and negligible visible reflectance over 400 nm–800 nm wavelengths. The composite of the invention includes (a) a light transmissive substrate; (b) a hard coat deposited onto the substrate; (c) a thin carbon layer having an average thickness between about 2 Å and about 100 Å; and (d) a plurality of transparent oxide layer pairs deposited onto the thin carbon layer, each transparent oxide layer pair comprising (i) a first transparent oxide having a refractive index between about 1.65 and about 2.65 and an average thickness between about 100 Å and about 3200 Å and (ii) a second transparent oxide layer having a refractive index between about 1.2 and about 1.85, and an average thickness between about 100 Å and about 3200 Å. The composite can also include an intermediate oxide layer disposed between the thin carbon layer and the first transparent oxide layer. Such intermediate oxide layer has a refractive index between about 1.5 and about 2.2 and is between 400 Å and about 1000 Å in thickness. In another preferred embodiment, the composite further comprises an outermost transparent low surface energy layer having a surface energy of less than about 40 dynes/cm. In another preferred embodiment, the transparent layers are deposited by vacuum or non-vacuum processes or by a combination of both processes.

13 Claims, 9 Drawing Sheets

Three-Layer AR Coating

U.S. PATENT DOCUMENTS

| | | | |
|---|---|---|---|
| 3,889,026 | 6/1975 | Groth | 428/34 |
| 3,901,997 | 8/1975 | Groth | 428/428 |
| 3,960,441 | 6/1976 | Kamiya et al. | 359/588 |
| 3,962,488 | 6/1976 | Gillery | 427/109 |
| 4,017,661 | 4/1977 | Gillery | 428/412 |
| 4,179,181 | 12/1979 | Chang | 427/160 |
| 4,194,022 | 3/1980 | Gillery | 427/109 |
| 4,234,654 | 11/1980 | Yatabe et al. | 428/333 |
| 4,313,647 | 2/1982 | Takazawa | 359/588 |
| 4,337,990 | 7/1982 | Fan et al. | 359/360 |
| 4,422,721 | 12/1983 | Hahn et al. . | |
| 4,519,154 | 5/1985 | Molari, Jr. | 40/615 |
| 4,548,691 | 10/1985 | Dietrich et al. | 427/160 |
| 4,556,277 | 12/1985 | Fan et al. | 359/360 |
| 4,609,267 | 9/1986 | Deguchi et al. | 351/163 |
| 4,639,069 | 1/1987 | Yatabe et al. | 427/160 |
| 4,648,691 | 3/1987 | Oguchi et al. | 349/162 |
| 4,721,349 | 1/1988 | Fan et al. | 359/360 |
| 4,725,109 | 2/1988 | Wank et al. | 359/890 |
| 4,790,922 | 12/1988 | Huffer | 204/192.27 |
| 4,802,967 | 2/1989 | Kittler | 204/192 |
| 4,828,346 | 5/1989 | Jacobson et al. | 427/163 |
| 4,865,711 | 9/1989 | Kittler | 204/192.14 |
| 4,907,846 * | 3/1990 | Tustison et al. | 359/580 |
| 4,913,762 | 4/1990 | Kittler | 204/192.14 |
| 4,938,857 | 7/1990 | Gillery | 204/192.27 |
| 4,952,783 | 8/1990 | Aufderheide et al. | 219/528 |
| 4,997,241 | 3/1991 | Muratomi | 359/589 |
| 5,059,295 | 10/1991 | Finley | 204/192.27 |
| 5,073,450 | 12/1991 | Nietering | 428/336 |
| 5,105,310 | 4/1992 | Dickey | 359/586 |
| 5,159,490 | 10/1992 | Amano et al. | 359/584 |
| 5,170,291 | 12/1992 | Szczyrbowski et al. | 359/580 |
| 5,181,141 * | 1/1993 | Sato et al. | 359/580 |
| 5,190,807 * | 3/1993 | Kimock et al. | 428/216 |
| 5,270,858 | 12/1993 | Dickey | 359/586 |
| 5,337,191 | 8/1994 | Austin | 359/885 |
| 5,362,552 | 11/1994 | Austin | 428/216 |
| 5,448,037 | 9/1995 | Takase et al. | 219/547 |
| 5,460,888 | 10/1995 | Hashimoto et al. | 428/432 |
| 5,510,173 | 4/1996 | Pass et al. | 428/216 |
| 5,521,765 | 5/1996 | Wolfe | 359/885 |
| 5,579,162 | 11/1996 | Bjornard et al. | 359/580 |
| 5,744,227 | 4/1998 | Bright et al. | 359/585 |
| 5,759,643 * | 6/1998 | Miyashita et al. | 428/1 |
| 5,763,061 * | 6/1998 | Ochiai et al. | 428/215 |
| 5,846,649 * | 12/1998 | Knapp et al. | 428/334 |
| 5,920,431 * | 7/1999 | Tokuhiro et al. | 359/581 |
| 5,989,693 * | 11/1999 | Yamasaki et al. | 359/580 |

FOREIGN PATENT DOCUMENTS

| | | | |
|---|---|---|---|
| 0 656 258 A2 | 7/1995 | (EP) . | |
| 0764857A1 | 3/1997 | (EP) | G02B/1/04 |
| 476315 | 4/1972 | (JP) . | |
| 476633 | 4/1972 | (JP) . | |
| 144702 * | 7/1985 | (JP) | 359/580 |
| 1543476 * | 2/1990 | (RU) | 359/580 |
| WO9421838 | 3/1994 | (WO) | C23C/14/18 |
| WO9513189 | 5/1995 | (WO) | B32B/15/04 |
| WO9611289 | 4/1996 | (WO) | C23C/16/26 |
| WO9631343 | 10/1996 | (WO) | B32B/19/00 |

* cited by examiner

Four-Layer AR Coating on In-organic Hard Coat

Two-Layer AR Coating

Three-Layer AR Coating

Four-Layer AR Coating

Key To Diagram

LR – Lay on idler rolls
IRM – Idler roll with resistance monitor
RCR – Rubber covered roll
PCD – Process cooled drum
I – Idler roll
N – Nip roll R & D Sputtering Coater

ANTI-REFLECTIVE COMPOSITE

RELATED APPLICATIONS

This application is a continuation application of provisional application Ser. No. 60/053,825 (filed Jul. 24, 1997) and Ser. No. 60/053,891 (filed Jul. 28, 1997).

FIELD OF THE INVENTION

The invention relates generally to improved composite structures exhibiting optical properties and more specifically to such structures which exhibit anti-reflective properties utilized in display applications.

BACKGROUND OF THE INVENTION

For the last several years, anti-reflective composites have been used on an ever expanding basis for a myriad of purposes. Anti-reflective composites are most commonly used on windows, mirrors, and an assortment of display applications which includes television screens and computer monitor screens to minimize reflective "glare." The most common design for such composites is one having a quarter-wave optical thickness at a particular wavelength. This design is capable of reducing reflectance of a surface to less than 1% over the visible range.

A typical anti-reflective composite consists of a light transmissive substrate and one or more transparent anti-reflective top layers. A transparent hard coat layer is often deposited between the substrate and the anti-reflective layers to give the composite both mechanical durability and physical strength. The materials used in each layer and the thicknesses of each layer are chosen so that a maximum amount of light is transmitted through the composite while a minimum amount of light is reflected by the composite.

Numerous anti-reflective composite designs are known to date, most of which are comprised of high and low refractive index materials in pairs. One of the earliest patents in this field, i.e., U.S. Pat. No. 2,478,385, describes a three-layer structure of medium/high/low refractive index materials over a glass substrate.

Another earlier patent dealing with anti-reflective coatings is U.S. Pat. No. 3,432,225, wherein is disclosed a method of combining a four-layer anti-reflective coating system using two different materials, i.e. $ZrO_2$ and $MgF_2$. A basic problem with this approach is the inherent softness of $MgF_2$, which limits the use of this approach in many applications.

Another multi-layer anti-reflective coating is disclosed in U.S. Pat. No. 3,565,509 wherein a three layer system is reduced to two using two materials for production simplicity.

The most common anti-reflective coating is a four layer structure. Such a design can be made from two anti-reflective coating materials rather than from three or four different materials as indicated in some earlier patents. The thickness of each layer is optimized to obtain the best properties over a broad range of the spectrum.

Most anti-reflective composite designs utilize high index dielectric anti-reflective layers as part of the construction. In applications where electromagnetic shielding and static discharge control are of primary concern, conductive high index oxides such as indium oxide or tin oxide are incorporated in the design structure. U.S. Pat. No. 4,422,721 covers the use of conductive coatings as part of the anti-reflective design structure.

U.S. Pat. No. 5,170,291 discloses a four-layer anti-reflective composite where DC reactive sputtering has been suggested as a preferred method of deposition. U.S. Pat. No. 5,579,162 discloses a multi-layer anti-reflective composite utilizing DC reactive sputtering as a preferred method of deposition for temperature sensitive substrates.

There are several problems with the anti-reflective composites presently known. A first problem is that special processes are required to deposit anti-reflective coatings onto a polymeric substrate.

A second problem is that most production techniques proposed for deposition of various layers of anti-reflective composites are possible, but few are practical. This is particularly important since there is no documented method of depositing anti-reflective coatings in a continuous roll coating (web) system.

A third problem with presently known anti-reflective composites is the general lack of manufacturing efficiency and low deposition rates previously inherent in the manufacture of anti-reflective composites.

A fourth problem with presently known anti-reflective composites is the great difficulty in being able to adhere anti-reflective coatings onto a polymeric substrate, especially a polymeric substrate which is covered with a hard coat.

Accordingly, there is a need for an improved anti-reflective composite which overcomes these problems in the prior art.

SUMMARY

The present invention solves these problems. The present invention is an anti-reflective composite having very high visible light transmission and negligible visible reflectance over 400 nm–800 nm wavelengths. Such coatings may be suitable for any surfaces requiring low light reflectance and requiring electrical and magnetic shielding. The proposed anti-reflective composites have utilization in a variety of display applications.

In one embodiment, the invention is an anti-reflective composite comprising: (a) a light transmissive substrate; (b) a hard coat deposited onto the substrate; (c) a first transparent oxide layer deposited onto the hard coat; and (d) a second transparent oxide layer deposited onto the first transparent oxide layer. Preferably, the transparent oxide layers are deposited by pulsed magnetron sputtering comprising either medium frequency AC sputtering or symmetric/asymmetric bi-polar DC sputtering.

In another preferred embodiment of the invention, a thin carbon layer, having an average thickness between about 2 Å and about 100 Å is deposited between the hard coat and the substrate. In another preferred embodiment of the invention, a thin carbon layer, having an average thickness of between about 2 Å and about 100 Å is deposited between the outermost transparent oxide layer and the low surface energy layer.

In more sophisticated embodiments of the invention, the composite comprises at least one pair of oxide layers deposited on top of the hard coat. Each pair of oxide layers comprises (i) a first transparent oxide layer deposited onto the hard coat, the first transparent oxide layer having a refractive index between about 1.65 and about 2.65 and having an average thickness between about 100 and about 3200 Å; and (ii) a second transparent oxide layer deposited onto the first transparent oxide layer, the second transparent oxide layer having a refractive index between about 1.2 and about 1.85 and having an average thickness between about 100 and about 3200 Å.

In a preferred embodiment of the composite described immediately above having at least one pair of oxide layers, one of the transparent oxide layers is a tertiary oxide layer.

In another preferred embodiment of the composite having at least one pair of oxide layers, a layer of aluminum oxide or zirconium oxide having a thickness between about 400 Å and about 100 Å is deposited between the hard coat and the pair of oxide layers. Other oxides possessing refractive indices of about 1.50 to about 2.20 can replace the above mentioned articles.

In still another preferred embodiment of the composite having at least one pair of oxide layers, the second transparent oxide layer in the outermost pair has an index of refraction between about 1.2 and about 1.85 and has a low surface energy of 40 dynes/cm or less.

In another preferred embodiment, the low surface energy layer is a vacuum deposited organic/inorganic mixture.

The transparent layers may be deposited by vacuum or non-vacuum processes or by a combination of both.

The hard coat layer may be an "ordinary" organic hard coat layer having an index of refraction between about 1.4 and about 2 and having an average thickness between about 0.5 and about 10 microns, preferably deposited by a wet chemistry process. The hard coat layer can also be either an inorganic material or an organic/inorganic material having an index of refraction between about 1.5 and about 2 and having an average thickness between about 0.5 and 10 microns, preferably deposited by a vacuum process.

DRAWINGS

These features, aspects and advantages of the present invention will become better understood with regard to the following description, appended claims and accompanying figures where:

DESCRIPTION OF THE INVENTION

Figure 1A:
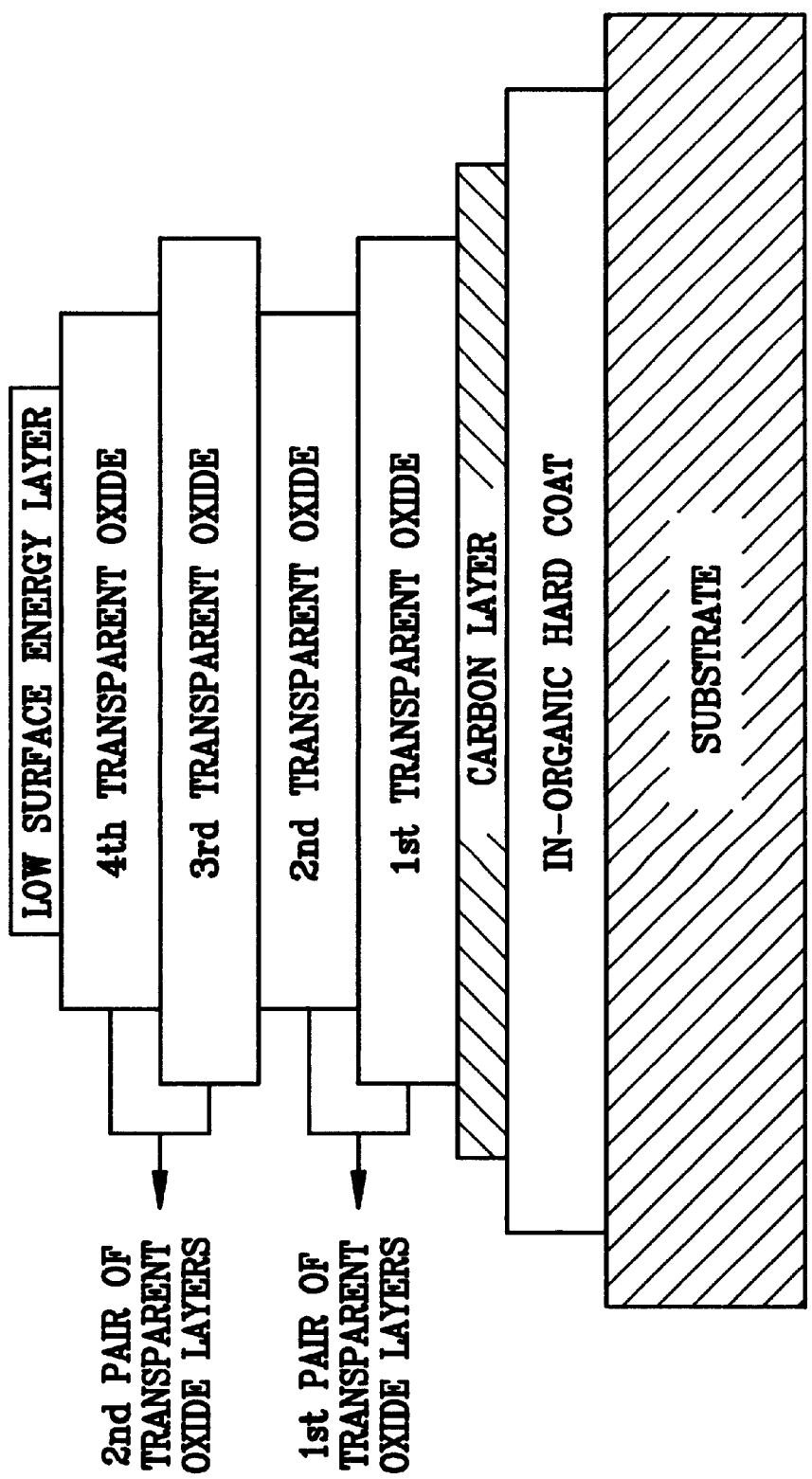
FIG. 1A is a diagrammatic representation of an anti-reflective composite having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is an improved anti-reflective composite. In all embodiments of the invention, the composite comprises a substrate and one or more anti-reflective layers deposited onto the substrate.

The substrate is light transmissive. The substrate can be a rigid material, such as glass or rigid polycarbonate. Preferably, the substrate is a flexible material, capable of being provided in a roll format, such as flexible polymeric material. Typically, such materials are flexible polycarbonate, polyethylene terephthalate ("PET") and other flexible polymeric materials having excellent optical and roll conformation properties.

Where the substrate is a flexible material, a transparent hard coat is commonly applied to give the substrate both additional physical strength as well as mechanical durability. The hard coat can also possess certain optical properties which can be used in structuring the overall anti-reflective composite.

In one embodiment of the invention, the hard coat is a "massive hard coat" layer having a thickness between about 0.5 and about 10 microns, and having a refractive index between about 1.2 and about 2. Typically, such a massive hard coat layer is chosen to be vacuum compatible for reduced degassing properties when being vacuum deposited. Suitable materials used to produce such massive hard coat layers are (i) polyurethanes, (ii) polymerizable long chain acrylics and methoxsiloxanes, and (iii) silicates, densely cross-linked acrylic polymers, solvent-cast epoxies and combinations of the above.

A preferred massive hard coat useful in the invention is an inorganic hard coat having an index of refraction between about 1.5 and about 2. Such a hard coat can be comprised of $Al_2O_3$, and/or $SiO_2$. Alternatively, a massive hard coat can also consist of an organic/inorganic material having an index of refraction between about 1.5 and about 2 deposited preferably by a vacuum deposition process.

One or more anti-reflective layers are deposited onto the hard coat. Such anti-reflective layers are chosen to have a thickness and refractive index so that the anti-reflective layers, in combination with the substrate and the hard coat, providing a composite exhibiting anti-reflective properties.

Preferably, a thin layer of carbon is deposited between the hard coat layer and the anti-reflective layers. The carbon layer has a thickness between about 2 Å and about 100 Å. The carbon layer serves as an adhesion promoting layer between the hard coat and the anti-reflective layers, particularly where the anti-reflective layers are deposited by sputtering. The carbon layer has also been found to minimize surface out gassing from the hard coated substrate. The nature of the carbon layer and methods for depositing it are fully described in U.S. Pat. Nos. 4,802,967, 4,865,711 and 4,913,762 (all issued to Wilfred Kittler), the entirety of each is incorporated herein by this reference.

Without such a carbon layer, other techniques such as chemical treatment, corona discharge, glow discharge or the deposition of a sub-oxide (primer) layer are used in an attempt to provide adequate adhesion between the hard coated substrate and the anti-reflective layers. All of these prior art attempts, however, provide insufficient adhesion, are unduly expensive or have other associated production problems with them.

In the invention, the thin layer of carbon is deposited on top of the hard coat, preferably by sputtering.

The carbon layer is especially useful in promoting the adhesion of the hard coat to materials having a low surface energy or a critical surface tension.

The carbon layer has further been found to minimize the outgassing of hard coats, one of the major problems in working with hard coats. By minimizing outgassing, composites of the invention using the thin carbon layer are considerably more stable and uniform during the deposition of the anti-reflective coating.

The carbon layer can also be used as an adhesion promoting layer interposed between the substrate and the hard coat layer and between the low surface energy layer and the outermost transparent oxide layer. For example, an anti-reflective composite can be provided which comprises of a flexible (substrate normally PET), a massive hard coat layer disposed onto the flexible substrate, and oxide layers disposed onto the hard coat layer, wherein a thin layer of carbon is interposed between the substrate and the hard coat, between the hard coat and oxide layers and/or between the oxides and the low surface energy layer of less than 40 dynes/cm$^2$.

The anti-reflective layers can be deposited by vacuum deposition techniques well-known in the art. Examples are evaporation, sputtering, PECVD, etc. In a typical embodiment, the anti-reflective layers are deposited by single or multiple cathode sputtering processes.

In one embodiment of the invention, the anti-reflective layers are deposited by a dual cathode sputtering method. A dual cathode sputtering method employs a mid-frequency AC sine wave pulse power supply. Dual cathode systems use two magnetron cathodes, disposed side by side. Dual cathode systems minimize problems with traditional DC magnetron sputtering, including arc control and inherent anode problems.

Inherent anode problems arise in reactive DC sputtering because the process chamber, the anode, as well as the greater part of the target, become covered by randomly grown insulating layers. The coverage of the anode and shielding with the insulating layer results in varying and difficult process conditions. Many "micro-arcs" are created during the sputtering of oxides causing defects in the deposited layer. To avoid this arcing, some people have used RF sputtering techniques, but the industrial applicability of RF sputtering is very restricted due to its low deposition rates and difficulty in matching network requirements.

In dual cathode sputtering systems, two magnetron sources are connected to a bi-polar pulse generator so that each cathode alternatively acts as the cathode and an anode of a magnetron discharge. In contrast to DC sputtering, the power is fed into the reaction discharge in a pulsed mode with a frequency in the range of 20–100 khz, which hinders the discharging of insulating regions and prevents the target from arcing. Dual cathode sputtering provides for the creative sputter deposition of coating materials which otherwise could not be produced on a large scale using DC sputtering technology.

Dual cathode magnetron sputtering methods offer the following advantages over DC sputtering methods of the prior art and other prior art coating technologies, such as DC and RF methods:

(1) Deposition rates are higher than in equivalent DC and RF-type sputtering methods;
(2) Increased process stability over long operating periods;
(3) Minimized layer imperfections due to arcing; and
(4) Cross-web uniformity of less than 2% can be readily achieved.

Dual cathode sputtering methods are preferred, especially for the production of both conductive and non-conductive anti-reflective composites comprising multiple anti-reflective coating layers.

Dual cathode sputtering is especially preferred where the anti-reflective layers are highly insulating (e.g., dielectric) materials. Arcing in reactive DC sputtering depositions of highly insulating materials is initiated by the electrical breakdown processes of the insulating layer on the magnetron cathode. This is because the deposition equipment includes a looping magnetic field which restricts the sputter erosion of the target to the "race track" area. In this area, the sputter rate is higher than the growth caused by back-sputtering. However, in a location further away from the race track growth rate exceeds target erosion and consequently these parts of the target will be covered with an insulating layer. This coverage will cause arcing of various types. Because of these arcs, there are defects in the coating layer and it is also very difficult to control the process.

The above-mentioned problem regarding DC sputtering can be resolved in principal by using RF techniques. However, RF sputtering does not provide high deposition rates. RF sputtering also generally entails high thermal substrate loads and high particle energy. Thus, RF sputtering is unsuitable for large area substrate coatings and for thermally sensitive flexible film substrates.

In another embodiment of the invention, the method of depositing the anti-reflective layers is symmetric/asymmetric bi-polar pulsed DC sputtering. Asymmetric bi-polar pulsed DC sputtering is preferred for single cathode sputtering because it minimizes problems with target poisoning associated with reactive DC sputtering methods. In reactive DC sputtering methods, there is a tendency to build up insulating layers on the target surface ("target poisoning"). When an insulator is deposited on the surface of the target, a capacitor is formed. The target acts as one conductor, the plasma as the other conductor and the insulating film forms the dielectric of the capacitor. Problems then occur because DC currents cannot flow through a capacitor. The first problem is that, without current flow, there can be no sputtering from this area of the target. Current flow is ion current, and therefore, if no argon ions strike the area, then no target atoms can be freed, and therefore no sputtering can occur. The second problem is that the capacitor formed may not have enough dielectricity to withstand the capability to charge all the way up to the applied voltage. If not, the breakdown of the insulation will cause a sudden release of charge carriers, forcing the local current density to increase into the area discharge region, which results in arcing. This arcing causes defects in the insulator films.

Asymmetric bi-polar pulsed DC sputtering, on the other hand, allow the set up of conditions which cause insulators on the target to be sputtered first with a higher sputter yield than the base material. This "preferential sputtering" effectively eliminates target poisoning. Preferential sputtering is accomplished by adding a reverse voltage bias pulse to the normal DC waveform. If the typical sputtering runs at 400 volts, the polarity is rapidly reversed to about +100 volts, causing the capacitor to be charged to opposite (−100 volts) on the surface exposed to the plasma. No sooner the reverse pulse ends and the voltage returns to sputter mode (400 volts), the plasma side of the capacitor is charged to −100 volts. When the target reaches −100 volts, the effective voltage on the plasma is −500 volts. Thus, the argon ions are drawn by electrostatic attraction to the insulators and strike with extra energy (−500 volts), which sputters the insulators off the target first, eliminating target poisoning and arcing.

Asymmetric bi-polar pulsed DC method depends on pulse frequency because the pulses must occur frequently enough to prevent charge build-up on the capacitors from exceeding the breakdown voltage. Typical process frequencies are between about 80 khz and about 150 khz. The reverse bias cannot be too high, as it will make a change from charging the capacitors to sputtering the shields and chamber walls. Typical voltages use are between about +75 to about +150 volts.

Dual cathode symmetric/asymmetric bi-polar pulsed DC method uses a bi-polar pulse power source with a periodic square-wave pulse chain. This offers independent control of positive and negative pulse times for the output voltage, and delivers maximum performance. By virtue of the free adjustability and the selectivity of the bi-polar pulsed DC dc+, dc−−, unipolar+ and unipolar− control functions are possible. This allows a plasma treatment of materials, such as conductors, semi-conductors and non-conductors.

In general, for insulating layers one can use pulse DC sputtering for increasing the deposition rate, eliminating arcing and obtaining high quality film at low temperatures. Unlike sinusoidal (AC) sputtering, the bi-polar pulsed DC (square wave form) gives independent control of "on and off" times to adjust the balance between plasma density and avoidance of arcing. The positive and negative pulse widths are adjustable over a considerable range from a few microseconds up to about one half second, and variable off times are available between the pulses. Frequency can be varied.

Dual cathode sputtering methods utilizing medium frequency AC pulsed power supply and symmetric/asymmetric bi-polar DC sputtering techniques are easily adaptable to wide area roll coating machines capable of depositing the anti-reflective layers over a continuous length of a substrate material.

In preferred embodiments of the invention, the anti-reflective layers are provided by at least one pair of oxide layers deposited on top of the hard coat. Each pair of oxide layers comprises (i) a first transparent oxide layer deposited onto the hard coat, the first transparent oxide layer having a refractive index between about 1.65 and about 2.65 and having an average thickness between about 100 and about 3200 Å; and (ii) a second transparent oxide layer deposited onto the first transparent oxide layer, the second transparent oxide layer having a refractive index between about 1.2 and about 1.85 and having an average thickness between about 100 and about 3200 Å. Preferably, the first transparent oxide layer is an electrically conductive coating.

In one most preferred embodiment, one of the transparent oxide layers is a tertiary alloy, such as $InZnSnO_x$, $InZnGaO_x$ and $InZnMgO_x$.

In another highly preferred embodiment, a layer of aluminum oxide or zirconium oxide having a thickness of about 400 and about 1000 Å is interposed between the hard coat and the pair of oxide layers. This interposed layer is chosen to have an index of refraction between about 1.50 and about 2.20.

In all of the embodiments of the invention, a low surface energy layer commonly known as an "anti-smudge" layer can be disposed on top of the anti-reflective layers. Typically, such an anti-smudge layer has a low surface energy of about 40 dynes/cm$^2$ or less. In unique embodiments of the invention, at least one pair of the oxide layers, the second transparent oxide layer in the outermost pair, has an index of refraction between about 1.2 and about 1.85, and has a low surface energy of 40 dynes/cm or less.

In a preferred embodiment of the invention, by interposing a layer of aluminum oxide or zirconium oxide between a carbon coated hard coat and a pair of transparent oxide layers, a composite having two anti-reflective layers can be made to perform as well as prior art composites having four or more anti-reflective layers.

Figure 2A:
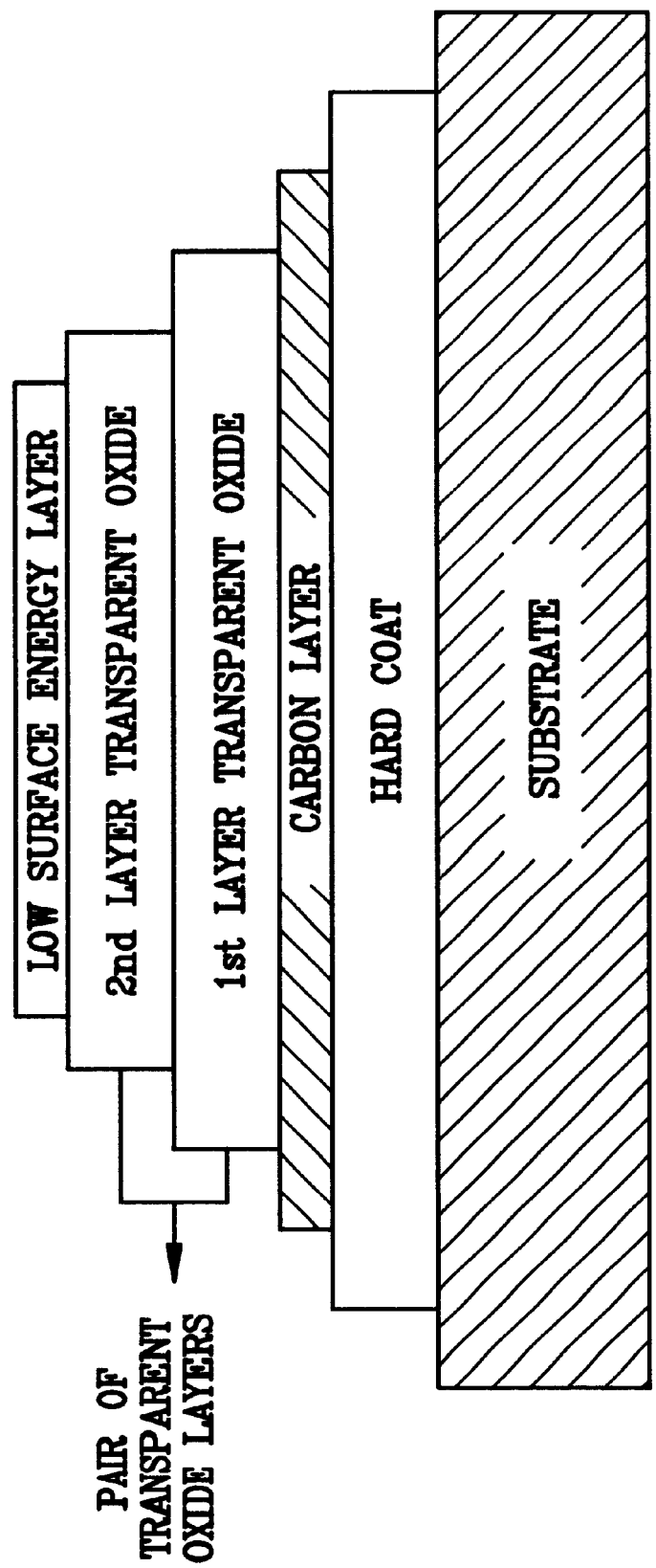
FIG. 2A is a diagrammatic representation of a second anti-reflective composite having features of the invention.
Figure 3A:
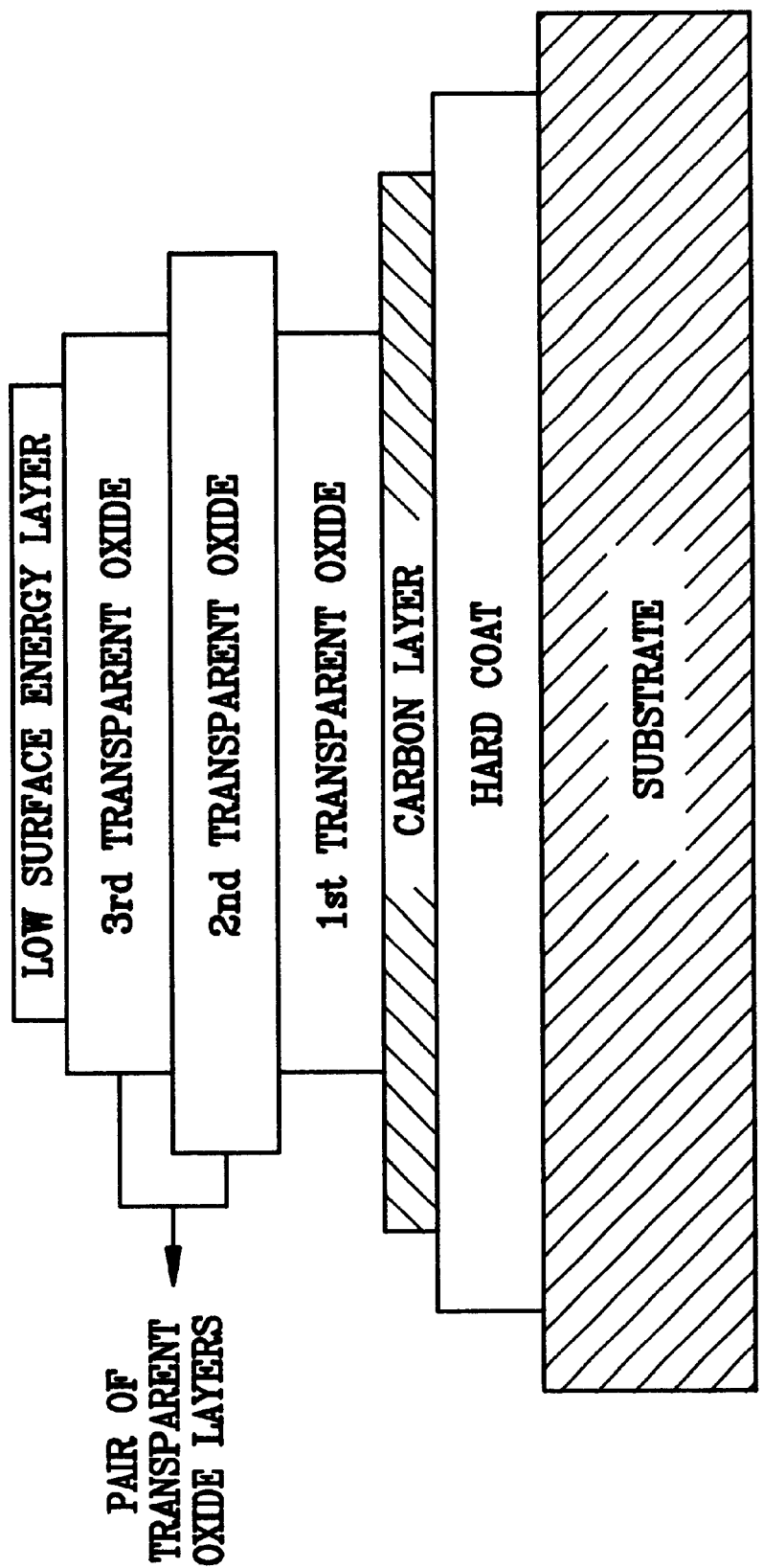
FIG. 3A is a diagrammatic representation of a third anti-reflective composite having features of the invention.
Figure 4A:
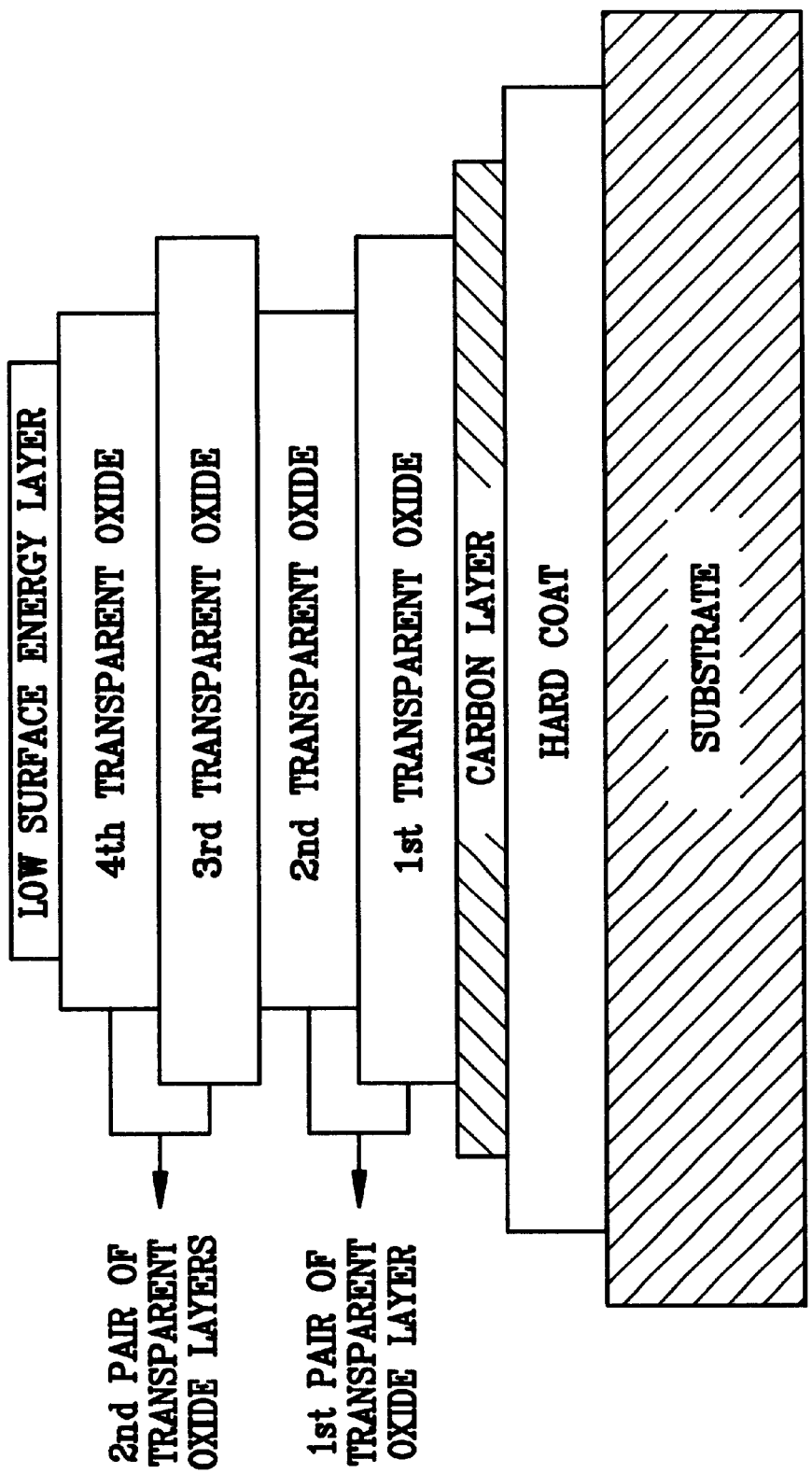
FIG. 4A is a diagrammatic representation of a fourth anti-reflective composite having features of the invention.

FIGS. 1A and 4A illustrate two different anti-reflective composites comprising four anti-reflective layers disposed on a hard coat layer. FIG. 2A illustrates an anti-reflective composite having two anti-reflective layers, and FIG. 3A illustrates an anti-reflective composite having three anti-reflective layers.

Figure 1B:
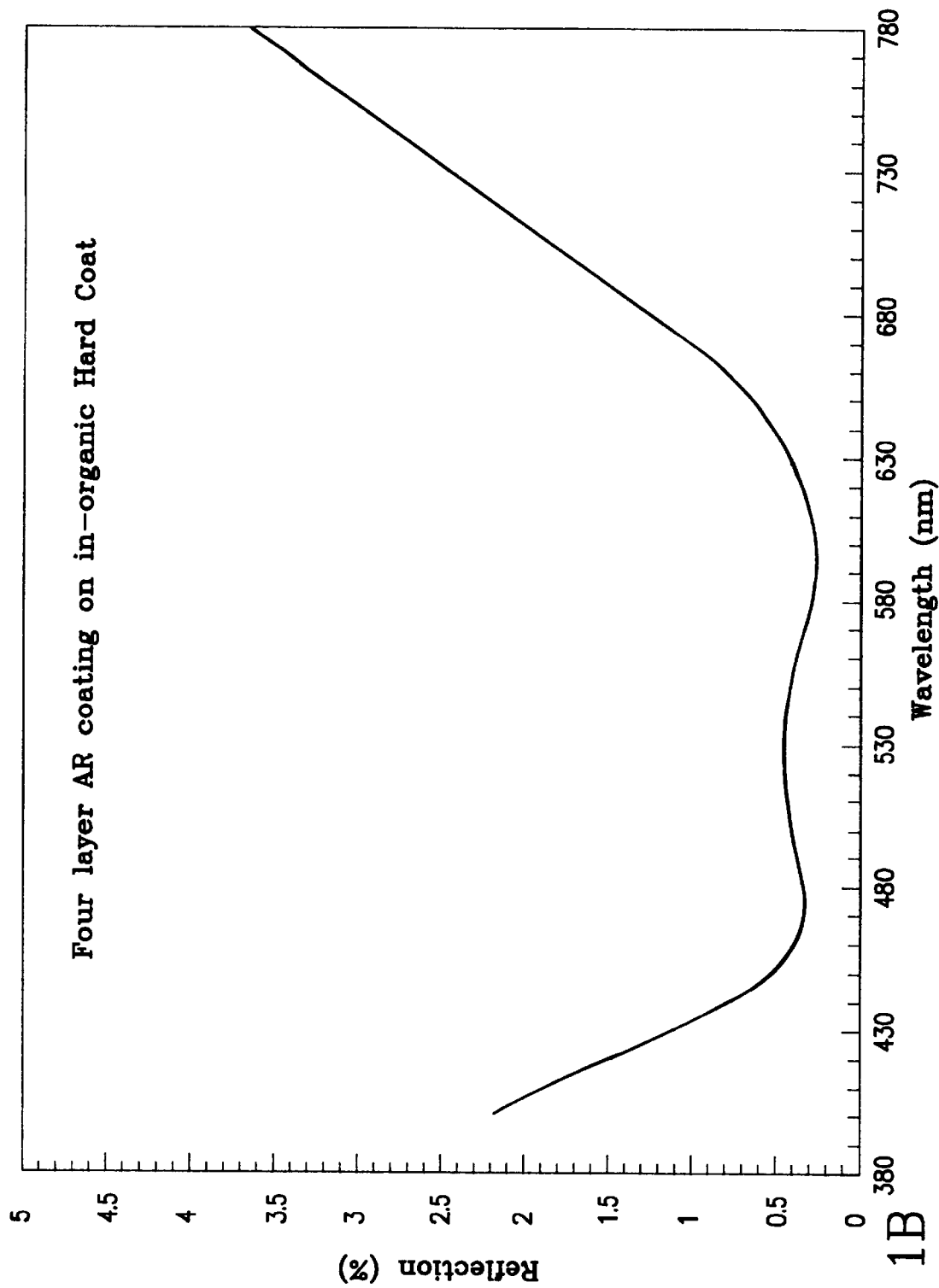
FIG. 1B is a graph showing the anti-reflectance properties of an anti-reflective composite such as illustrated in FIG. 1A.

FIG. 1B illustrates the anti-reflective properties of an anti-reflective composite such as illustrated in FIG. 1A. The substrate is PET and has a refractive index of 1.65. The hard coat is an inorganic $Al_2O_3$ material, vapor deposited onto the substrate. The hard coat has a refractive index of 1.70 and has an average thickness of 4 microns. The carbon layer has an average thickness of 5 Å. The carbon layer is deposited by vacuum deposition. The first transparent oxide layer is $SiO_2$, having a refractive index of 1.46. The second transparent oxide layer is $Al_2O_3$, having a refractive index of 1.70. The third transparent oxide layer is ITO, having a refractive index of 2.0, and the fourth refractive oxide layer is $SiO_2$, having a refractive index of 1.46. Each of the transparent oxide layers is deposited by pulsed magnetron sputtering comprised of medium frequency AC sine wave sputtering and symmetric/asymmetric bipolar pulsed DC sputtering. The low surface energy layer is deposited on the top of the fourth transparent oxide layer. The low surface energy layer is a fluoropolymer material, having a refractive index of 1.38, and an average thickness of 20 Å. The low surface energy layer has a surface energy of less than about 40 dynes/cm$^2$.

Figure 2B:
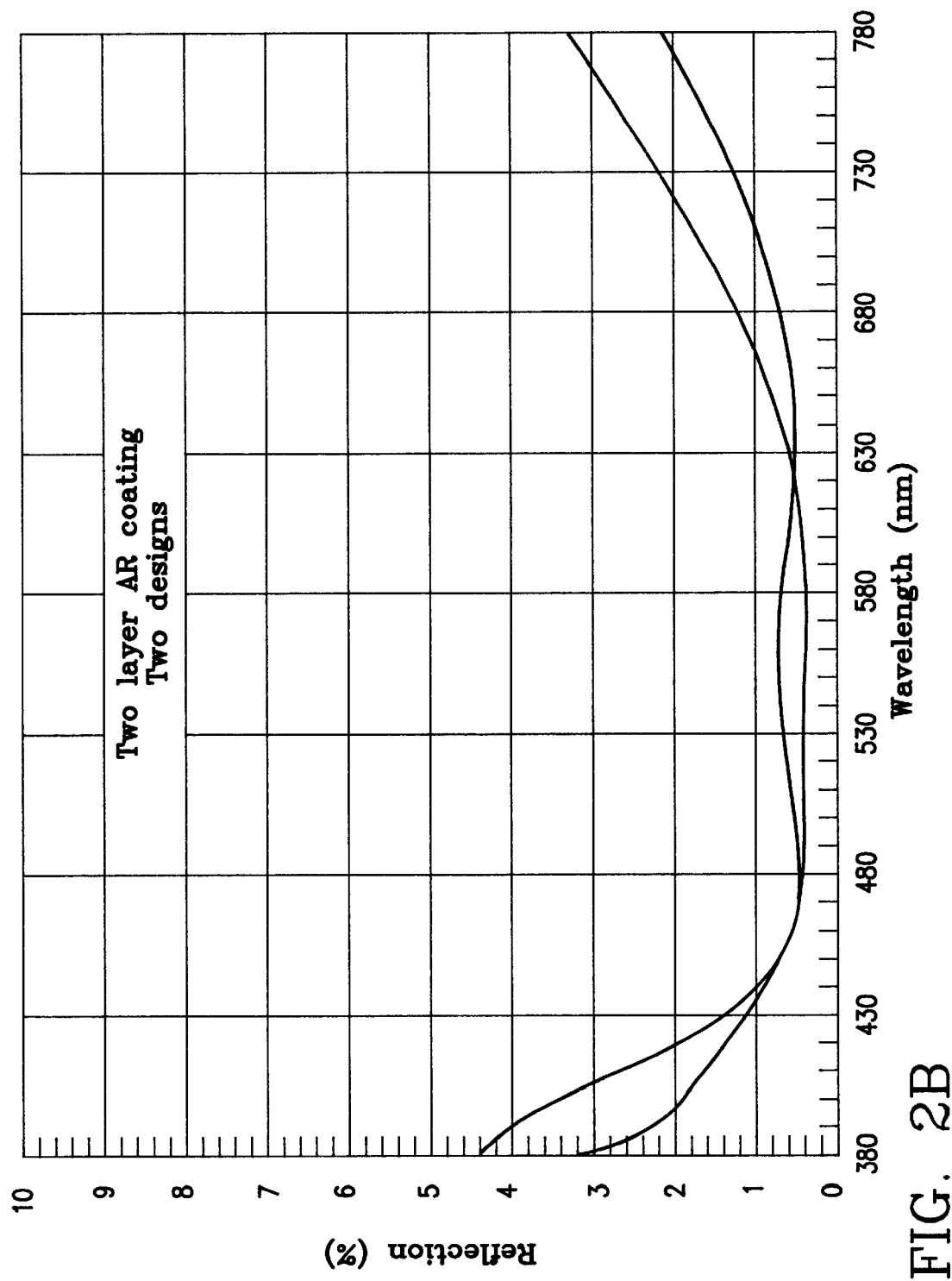
FIG. 2B is a graph showing the anti-reflective properties of an anti-reflective composite such as illustrated in FIG. 2A.

FIG. 2B illustrates the anti-reflective properties of two anti-reflective composites having a two-layer design, such as illustrated in FIG. 2A. In both designs, the substrate material is PET and has a refractive index of 1.65. The hard coat is a UV cured acrylic hard coat applied onto the substrate. The hard coat has a refractive index of 1.63 and has an average thickness of 6 microns. The carbon layer has an average thickness of 5 Å. The carbon layer is deposited by vacuum deposition. The first transparent oxide layer is ITO having a refractive index of 2.0. The second transparent oxide layer is $SiO_2$, having a refractive index of 1.46. Each of the transparent oxide layers is deposited by pulse magnetron sputtering comprised of medium frequency AC sine wave sputtering and symmetric/asymmetric bipolar pulsed DC sputtering. The low surface energy layer is deposited on the top of the second transparent oxide layer. The low surface energy layer is a fluoropolymer material, having a refractive index of 1.38, and an average thickness of 20 Å. The low surface energy layer has a surface energy of less than about 40 dynes/cm$^2$.

The only difference between the two anti-reflective composites whose anti-reflective properties are illustrated in FIG. 2A is the hard coat refractive indices and the coating thicknesses.

Figure 3B:
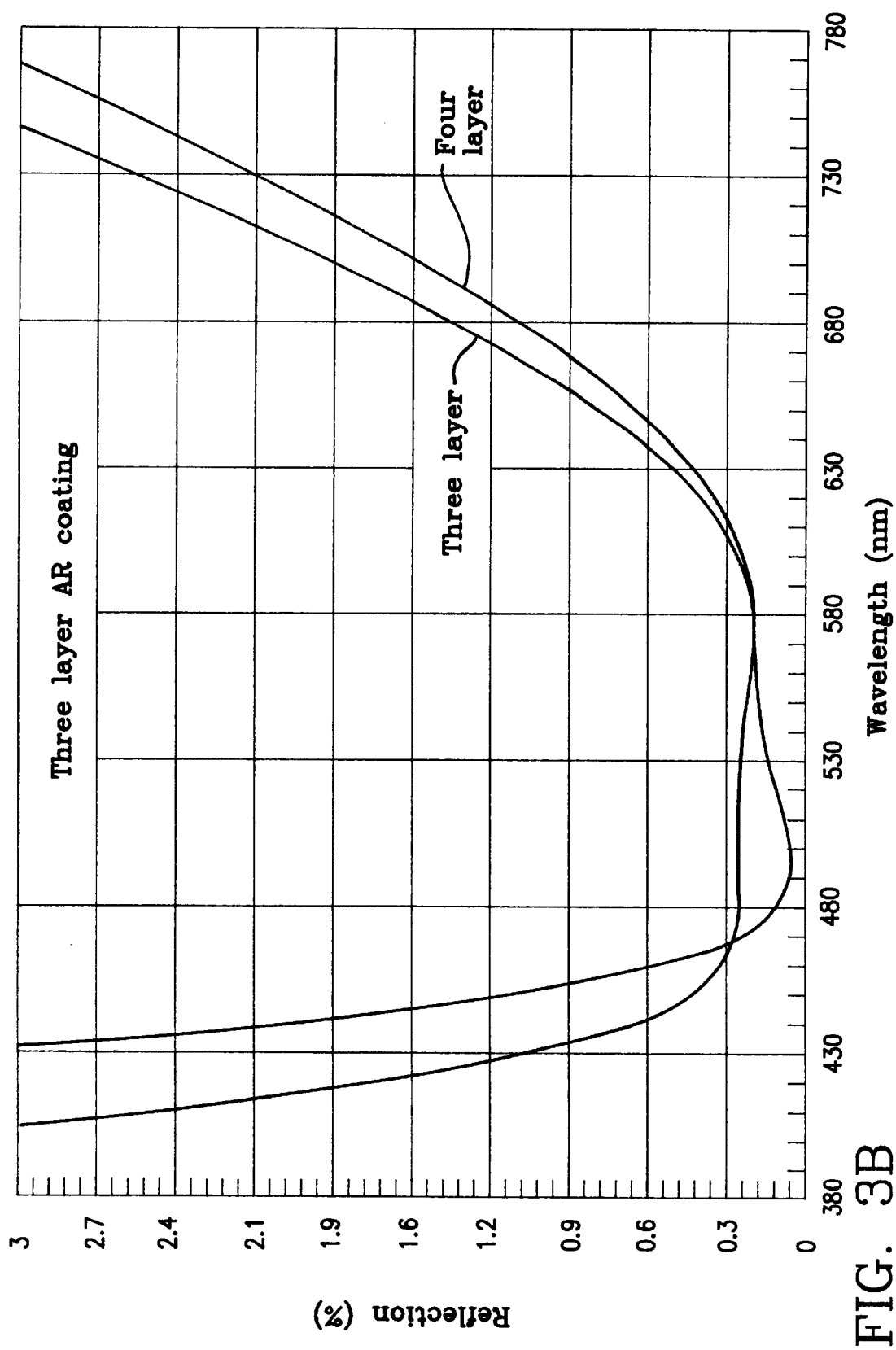
FIG. 3B is a graph showing the anti-reflective properties of an anti-reflective composite such as illustrated in FIG. 3A.

FIG. 3B illustrates the anti-reflective properties of two anti-reflective composites, one having a three-layer design, such as illustrated in FIG. 3A, and one having a four-layer design, such as illustrated in FIG. 1A. In the three-layer design, the substrate material is PET and has a refractive index of 1.65. The hard coat is a UV cured acrylic hard coat applied onto the substrate. The hard coat has a refractive index of 1.50, and has an average thickness of 6 microns. The carbon layer has an average thickness of 5 Å and is deposited by vacuum deposition. The first transparent oxide layer is $Al_2O_3$, having a refractive index of 1.70. The second transparent oxide layer is ITO, having a refractive index of 2.0. The third transparent oxide layer is $SiO_2$, having a refractive index of 1.46. The low surface energy layer is deposited on the top of the third transparent oxide layer. The low surface energy layer is a fluoropolymer material, having a refractive index of 1.38, and an average thickness of 20 Å. The low surface energy layer has a surface energy of less than about 40 dynes/cm.

The four-layer design whose reflective properties are illustrated in FIG. 3B has a PET substrate with a refractive index of 1.65. The hard coat is a UV cured acrylic hard coat material, applied onto the substrate. The hard coat has a refractive index of 1.50, and has an average thickness of 6 microns. The carbon layer has an average thickness of 5A. The carbon layer is deposited by vacuum deposition. The first transparent oxide layer is ITO, having a refractive index of 2.0. The second transparent oxide layer is $SiO_2$, having a refractive index of 1.46. The third transparent oxide layer is ITO, having a refractive index of 2.0, and the fourth transparent oxide layer is $SiO_2$, having a refractive index of 1.46. Each of the transparent oxide layers is deposited by pulsed magnetron sputtering comprised of medium frequency AC sine wave sputtering and symmetric/asymmetric bipolar pulsed DC sputtering. The low surface energy layer is a fluoropolymer material, having a refractive index of 1.38, and an average thickness of 20 Å. The low surface energy layer has a surface energy of less than about 40 dynes/cm.

Figure 4B:
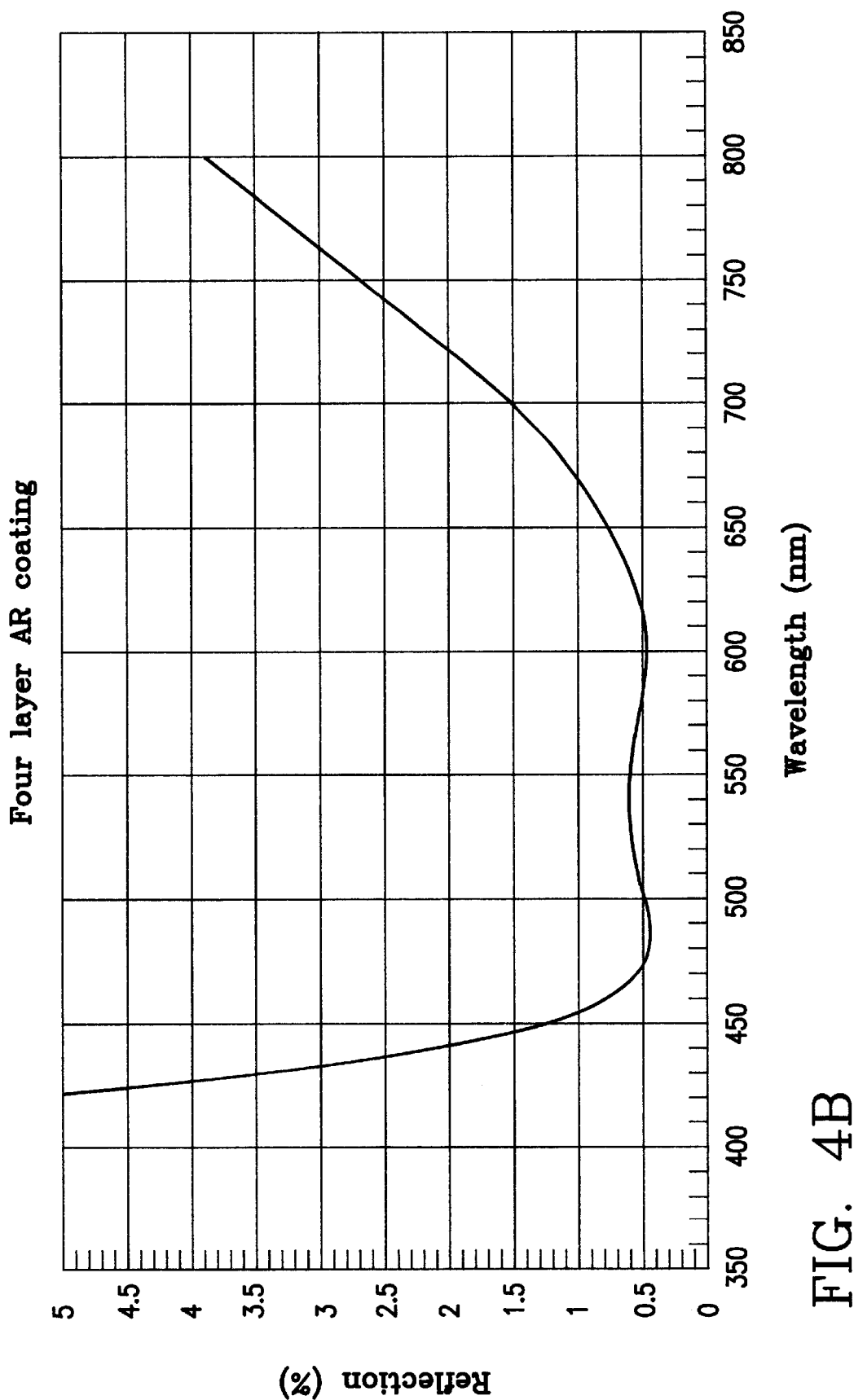
FIG. 4B is a graph showing the anti-reflective properties of another anti-reflective composite, such as illustrated in FIG. 4A.

FIG. 4B illustrates the anti-reflective properties of an anti-reflective composite, such as illustrated in FIG. 4A. In this embodiment, the substrate is PET and has a index of 1.65. The hard coat is a UV cured acrylic hard coat material, applied onto the substrate. The hard coat has a refractive index of 1.50, and has an average thickness of 6 microns. The carbon layer has an average thickness of 5 Å and is deposited by vapor deposition. The first transparent oxide layer is ITO, having a refractive index of 2.0. The second transparent oxide layer is $SiO_2$, having a refractive index of 1.46. The third transparent oxide layer is ITO, having a refractive index of 2.0, and the fourth transparent oxide layer is $SiO_2$, having a refractive index of 1.46. Each of the transparent oxide layers is deposited by pulsed magnetron sputtering comprised of medium frequency AC sine wave and asymmetric bipolar pulsed DC sputtering. The low surface energy layer is a fluoropolymer material, having a refractive index of 1.38, and an average thickness of 20 Å. The low surface energy layer is deposited by wet chemistry and sputtering. The low surface energy layer has a surface energy of less than about 40 dynes/cm.

The following describes the preparation of an anti-reflective composite having features of the invention. This example is provided for illustrative purposes only, and is not meant to limit the scope of the invention.

EXAMPLE

Figure 5:
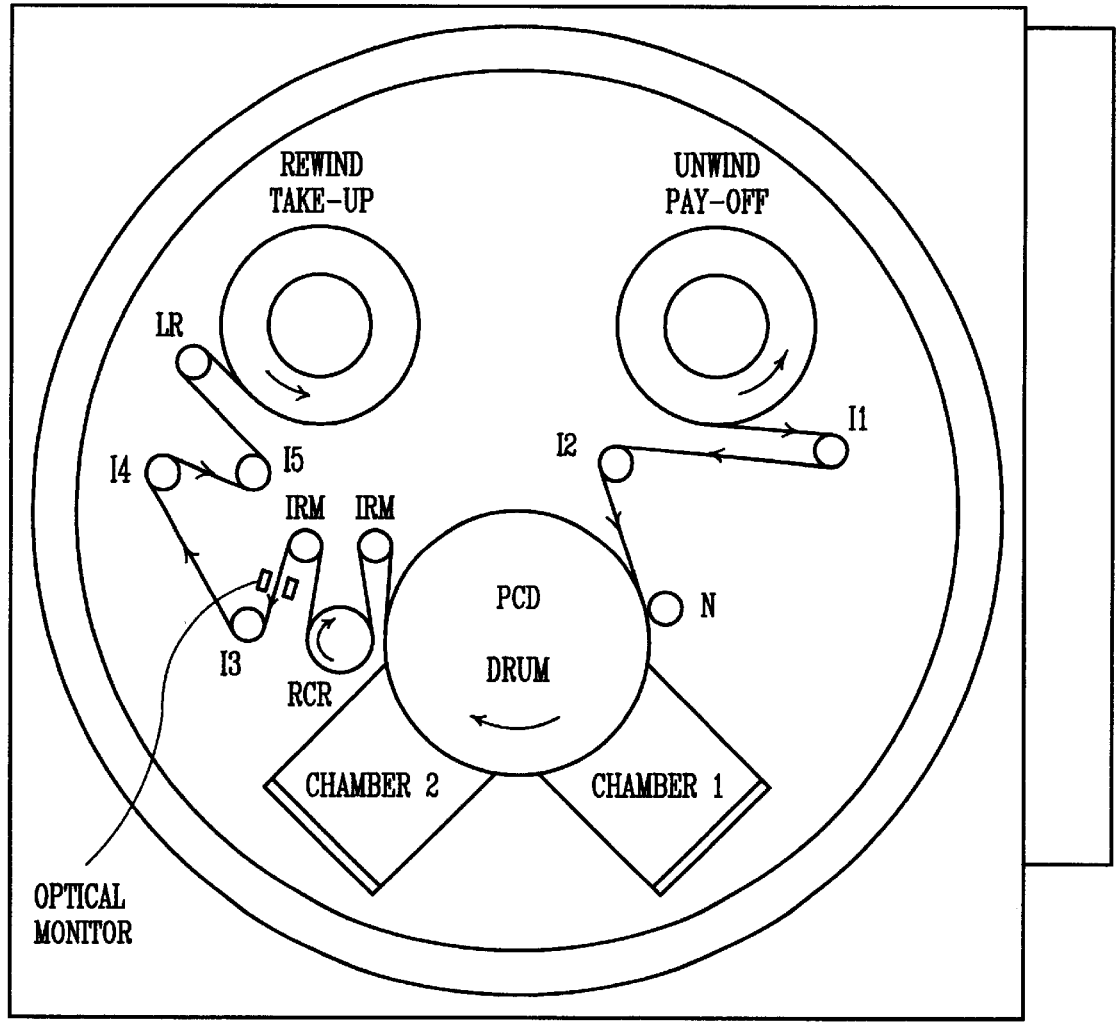
FIG. 5 is a diagram of a sputter coating machine useable in the invention.

A four-layer anti-reflective composite is produced in a laboratory scale research and development roll to roll sputtering coater, such as illustrated in FIG. 5. The cathode size is 15"×4.5" and the drum size is 16". FIG. 5 shows a schematic diagram of a laboratory scale R & D sputtering coater.

Description of Vacuum Coating Process:
 Substrate: Flexible roll of 175 microns hardcoated PET. Refractive index of PET is 1.65 thickness of the hard coat is 6 microns and refractive index is 1.50.
 Pass 1: Glow discharge (plasma cleaning) process conditions:

| | |
|---|---|
| Gas: | argon:oxygen 50:50 |
| Power: | 50 watts |
| Voltage: | 900 volts |
| Current: | 0.06 amps |
| Speed: | 2.5 ft./min. |

Pass 2:
Carbon layer process conditions:

| | |
|---|---|
| Target: | Carbon (99.9999%) |
| Gas: | Argon 100 sccm |
| Power: | 1.5 kilowatts |
| Voltage: | 562 volts |
| Current: | 2.68 amps |
| Speed: | 24 ft./min. |
| Total Pressure: | 2.56 microns |
| Deposition Technique: | DC sputtering |

Pass 3:
First transparent oxide layer process conditions:

| | |
|---|---|
| Target: | In/Sn 90/10 |
| Gas: | Argon: 100 sccm Oxygen: 34 sccm |
| Power: | 2.5 kw |
| Voltage: | 369 volts |
| Current: | 6.8 amps |
| Speed: | 4.5 ft./min. |
| Total Pressure: | 2.54 microns |
| Deposition Technique: | Asymmetric bipolar pulsed DC sputtering |

Pass 4:
Second transparent oxide layer process conditions:

| | |
|---|---|
| Target: | Silicon (Boron doped) |
| Gas: | Argon: 68 sccm Oxygen: 25 sccm |
| Power: | 2.5 kw |
| Voltage: | 396 volts |
| Current: | 6.3 amps |
| Speed: | 2.6 ft./min. |
| Total Pressure: | 2.0 microns |
| Deposition Technique: | Asymmetric bipolar pulsed DC sputtering |

Pass 5:
Third transparent oxide layer process conditions:

| | |
|---|---|
| Target: | 90:10 Indium/Tin. |
| Gas: | Argon: 100 sccm Oxygen: 34 sccm |
| Power: | 2.5 kw |
| Voltage: | 369 volts |
| Current: | 6.8 amps |
| Speed: | 1.63 ft./min. |
| Total Pressure: | 2.54 microns |
| Deposition Technique: | Asymmetric bipolar pulsed DC sputtering |

Pass 6:
Fourth transparent oxide layer process conditions:

| | |
|---|---|
| Target: | Silicon (Boron doped) |
| Gas: | Argon: 68 sccm Oxygen: 25 sccm |

-continued

| Power: | 2.5 kw |
| --- | --- |
| Voltage: | 396 volts |
| Current: | 6.3 amps |
| Speed: | 0.68 ft./min. |
| Total Pressure: | 2.0 microns |
| Deposition Technique: | Asymmetric bipolar pulsed DC sputtering |

After the vacuum deposition of the hardcoated PET, a very thin low surface energy layer (fluoropolymer) was deposited onto the sample by wet chemistry.

Properties of the above anti-reflective composite:

Total transmittance: >92%

Reflection average between 450 and 650 nm: 0.45%

Adhesion test (cross cut 100 squares 1.5 mm, snap 5 times): pass

Hardness test (ASTM D 3363): Pass (3H pencil)

Steel wool abrasion (#0000 Steel wool 60 strokes 200 gms weight): pass (no visible deterioration)

Humidity test (50° C., 95% RH for 48 hours): pass reflectance, adhesion and ethanol abrasion Electrical conductivity: less than 250 ohms/sq.

Low surface energy layer (anti-smudge): less than 40 dynes/cm

Samples produced had excellent anti-reflective properties, extremely durable, with very low reflection and good transmission. These samples, when applied to display screen (television or computer monitor) drastically enhanced the brightness by reducing light glare on the screen.

Having thus described the invention, it should be apparent that numerous structural modifications and adaptations may be resorted to without departing from the scope and fair meaning of the instant invention.

What is claimed is:

1. An anti-reflective composite comprising:
   (a) a light transmissive substrate;
   (b) a hard coat deposited onto the substrate;
   (c) a thin carbon layer having an average thickness between about 2 angstroms and about 100 angstroms;
   (d) a first transparent oxide layer deposited onto the thin carbon layer;
   (e) a second transparent oxide layer deposited onto the first transparent oxide layer;
   (f) a second thin carbon layer having an average thickness between about 2 angstroms and about 100 angstroms and deposited on the outermost transparent oxide layer; and
   (g) an outermost transparent low surface energy layer having a surface energy of less than about 40 dynes/cm deposited on said second thin carbon layer.

2. An anti-reflective composite according to claim 1 wherein said first and second transparent oxide layers comprise a first pair of transparent oxide layers and said composite further comprises at least one other pair of first and second transparent oxide layers wherein
   (i) said first transparent oxide layers have a refractive index between about 1.65 and about 2.65 and an average thickness between about 100 angstroms and about 3200 angstroms and
   (ii) said second transparent oxide layers have a refractive index between about 1.2 and about 1.85, and an average thickness between about 100 angstroms and about 3200 angstroms.

3. An anti-reflective composite comprising
   (a) a light transmissive substrate;
   (b) a hard coat deposited onto the substrate;
   (c) a thin carbon layer having an average thickness between about 2 angstroms and about 100 angstroms;
   (d) a first transparent oxide layer deposited onto the thin carbon layer; and
   (e) a second transparent oxide layer deposited onto the first transparent oxide layer;
   wherein one of the transparent oxide layers is a tertiary alloy oxide layer.

4. An anti-reflective composite according to claim 3 further comprising an outermost transparent low surface energy layer having a surface energy of less than about 40 dynes/cm.

5. An anti-reflective composite according to claim 3 wherein said first and second transparent oxide layers comprise a first pair of transparent oxide layers and said composite further comprises at least one other pair of first and second transparent oxide layers wherein
   (i) said first transparent oxide layers have a refractive index between about 1.65 and about 2.65 and an average thickness between about 100 angstroms and about 3200 angstroms and
   (ii) said second transparent oxide layers have a refractive index between about 1.2 and about 1.85, and an average thickness between about 100 angstroms and about 3200 angstroms.

6. An anti-reflective composite comprising:
   (a) a light transmissive substrate;
   (b) a hard coat deposited onto the substrate;
   (c) a thin carbon layer having an average thickness between about 2 angstroms and about 100 angstroms;
   (d) an intermediate oxide layer;
   (e) a first transparent oxide layer deposited onto the intermediate oxide layer; and
   (f) a second transparent oxide layer deposited onto the first transparent oxide layer;
   wherein said intermediate oxide layer is disposed between the thin carbon layer and the first transparent oxide layer and has a thickness between about 400 angstroms and about 1000 angstroms, and has a refractive index between about 1.5 and about 2.2.

7. An anti-reflective composite according to claim 6 further comprising an outermost transparent low surface energy layer having a surface energy of less than about 40 dynes/cm.

8. An anti-reflective composite according to claim 6 wherein said first and second transparent oxide layers comprise a first pair of transparent oxide layers and said composites further comprises at least one other pair of first and second transparent oxide layers wherein
   (i) said first transparent oxide layers have a refractive index between about 1.65 and about 2.65 and an average thickness between about 100 angstroms and (ii) said second transparent oxide layers have a refractive index between about 1.2 and about 1.85, and an average thickness between about 100 angstroms and about 3200 angstroms.

9. The anti-reflective composite of claim 6 wherein said intermediate oxide layer is aluminum oxide.

10. The anti-reflective composite of claim 6 wherein said intermediate oxide layer is zirconium oxide.

11. An anti-reflective composite comprising
    (a) a light transmissive substrate;
    (b) a hard coat deposited onto the substrate;
    (c) a thin carbon layer having an average thickness between about 2 angstroms and about 100 angstroms;
    (d) a first transparent oxide layer deposited onto the thin carbon layer;
    (e) a second transparent oxide layer deposited onto the first transparent oxide layer; and
    (f) an outermost transparent oxide layer disposed distalmost from the substrate, the outermost transparent oxide layer having an index of refraction between about 1.2 and about 1.5 and having a surface energy of less than about 40 dynes/cm.

12. An anti-reflective composite according to claim 11 wherein said first and second transparent oxide layers comprise a first pair of transparent oxide layers and said composite further comprises at least one other pair of first and second transparent oxide layers wherein
    (i) said first transparent oxide layers have a refractive index between about 1.65 and about 2.65 and an average thickness between about 100 angstroms and about 3200 angstroms and
    (ii) said second transparent oxide layers have a refractive index between about 1.2 and about 1.85, and an average thickness between about 100 angstroms and about 3200 angstroms.

13. An anti-reflective composite comprising;
    (a) a light transmissive substrate;
    (b) a hard coat deposited onto the substrate;
    (c) an intermediate oxide layer deposited onto the hard coat, wherein said intermediate oxide layer has a thickness between about 400 angstroms and about 1000 angstroms and has a refractive index between about 1.5 and about 2.2; and
    (d) at least one pair of transparent oxide layers comprising
        (i) a first transparent oxide layer having a refractive index between about 1.65 and about 2.65 and an average thickness between about 100 angstroms and about 3200 angstroms and
        (ii) a second transparent oxide layer having a refractive index between about 1.2 and about 1.85, and an average thickness between about 100 angstroms and about 3200 angstroms,
    wherein said intermediate oxide layer comprises aluminum oxide.

* * * * *